Patented June 30, 1936

2,045,888

UNITED STATES PATENT OFFICE 2,045,888

PREPARATION OF SULPHENE AMIDES

Eduard Tschunkur and Hugo Köhler, Cologne-Mulheim, Germany, assignors to I. G. Farbenindustrie Aktiengesellschaft, Frankfort-on-the-Main, Germany No Drawing. Application April 9, 1934, Serial No. 719,746. In Germany April 13, 1933

5 Claims. (Cl. 260—43)

Our present invention relates to the preparation of sulphene amides.

We have found that organic sulphene amides i. e. compounds which contain the grouping

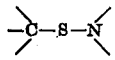

can be prepared in a simple manner and in a good yield by subjecting an organic compound, which contains the sulphhydryl group, to the action of an oxidizing agent in the presence of a secondary amine. Instead of compounds which contain sulphhydryl groups there can be used with the same advantage the corresponding disulphides. For instance, dibenzothiazyl disulphide can be used instead of mercaptobenzothiazole.

We wish to point out that the present process is not limited to a few amines and mercapto compounds only, but can quite generally be applied to every secondary amine and every organic mercapto compound. As secondary amines there may be mentioned, for instance:—dimethylamine, diethylamine, diethanolamine, dibutylamine, methylethylamine, piperidine, or substitution products thereof, morpholine, thiomorpholine, methylbenzylamine, dibenzylamine, methylnaphthylamine and the like, and it may be pointed out that substitution products of the said compounds can be used with the same advantage. As examples for compounds which contain the sulphhydryl group there may be mentioned:—mercaptans, mercaptoarylenethiazoles, mercaptoarylene imidazoles, mercaptoarylene oxazoles, dithiocarbamic acids and the salts thereof and substitution products of the said compounds. Various oxidizing agents can be used in the present process, particularly such agents, as are effective in an alkaline medium and as examples thereof may be mentioned, halogens, such as chlorine or bromine, alkali hypochlorites, sodium ferricyanide, hydrogen peroxide or derivatives thereof and the like.

The reaction can be performed in an aqueous alkaline medium, if desired, in the presence of indifferent organic solvents. The reaction can be started in most cases at ordinary temperature, heating being preferable, however, in order to accelerate the oxidation. The secondary amines are preferably employed in at least one molecular amount calculated upon the amount of the mercaptan, whereas at least two molecular amounts of the secondary amines are required if disulphides are used as starting materials.

The following examples will illustrate the invention, without limiting it thereto, the parts being by weight:—

Example 1

167 parts of mercaptobenzothiazole are well stirred with 750 parts of water and 85 parts piperidine are added thereto. Thereupon an aqueous solution which contains about 82 parts of sodium hypochloride is gradually added in the course of about 5 hours, the temperature being about 35° C. After some stirring, the reaction mixture is cooled down to about 20° C., the precipitate is filtered off, washed with water and dried. The benzo-thiazyl-2-sulphene-piperidide thus obtained has a melting point of about 72 to 76° C., the yield is about 85%.

Example 2

50 parts of mercaptobenzothiazole are stirred with 500 parts of water while adding thereto about 80 parts of sodium hydroxide lye of about 30% and 38.5 parts of piperidine. A solution of 200 parts of potassium ferricyanide in 600 parts of water is added thereto in the course of about 5 hours, the temperature being 35° C. About 60 parts of benzothiazyl-2-sulphene piperidide are obtained thereby.

The excess of piperidine, which has not undergone the reaction, can be removed from the filtrate.

Example 3

50 parts of mercaptobenzothiazole are stirred with 250 parts of water and 51 parts of piperidine are added thereto. In the course of a few hours a solution of hydrogen peroxide, which corresponds to about 10.2 parts of $H_2O_2$ are caused to run in, the temperature being about 40° C. After some stirring, the reaction mixture is cooled down and the benzothiazyl-2-sulphene-piperidide is filtered off.

Example 4

50 parts of dibenzothiazyldisulphide of the formula:—

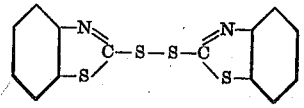

are stirred with 750 parts of water and 30 parts of piperidine are added thereto. An aqueous solution which contains about 24.5 parts of sodium hypochlorite is caused to run in in the course of a few hours at a temperature of about 55° C. After some stirring and cooling the precipitate is filtered off. The yield of benzothiazyl-2-sulphene piperidide is about 60 parts, which corresponds to about 80%.

Example 5

375 parts of mercaptobenzothiazole are stirred with 1500 parts of water and 500 parts of diethylamine are added thereto. In the course of about 5 hours a solution which contains about 184 parts of sodium hypochlorite is dropped in at a temperature of about 35° C. The benzothiazyl-2-sulphene-ethylamide separates in form of an oil of weakly brownish color, which is siphoned off, washed with water and dried in vacuo. The yield is about 480 parts, which corresponds to about 90%.

Example 6

74 parts of tetraethylthiuram disulphide are stirred with 300 parts of water and 110 parts of diethylamine. An aqueous solution of 20.5 parts of sodium hypochlorite is caused to run in in the course of about 6 hours at a temperature of about 50° C. After the tetraethylthiuram disulphide is dissolved, the sulphene amide of the formula:—

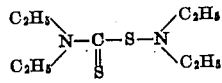

separates in form of an oil of a weakly brownish color. After one hour's stirring, 200 parts of water are added to the mixture and the oil is siphoned off, washed with water and dried.

Example 7

75 parts of 2-mercaptobenzimidazole are stirred with 300 parts of water with the addition of 128 parts of piperidine. In the course of about 5 hours an aqueous solution of 41 parts of sodium hypochlorite is added thereto at a temperature of about 40° C. After one hour's stirring 300 parts of water are added to the mixture and the whole is cooled down to about 20° C. The benzimide azyl-2-sulphene piperidide is filtered off, washed with water and dried. After recrystallization from alcohol the product shows a melting point of 190–193° C.

Example 8

50 parts of 2-mercapto-naphthoxazole are stirred with 200 parts of water, 64 parts of piperidine are added thereto and the whole is heated to 40° C. Into the clear solution thus obtained there is caused to run in an aqueous solution of 20.5 parts of sodium hypochlorite in the course of 5 hours while keeping the temperature at about 40° C. After one hour's stirring 300 parts of water are added thereto. After cooling down to 20° C. the sulphene amide formed is filtered off, washed with water and dried. The product which is obtained in a yield of about 90% shows a melting point of about 63–66° C. and, after recrystallization from alcohol, a melting point of 71–73° C.

Example 9

50 parts of mercaptobenzothiazole are stirred with 1000 parts of water and 160 parts of a sodium hydroxide lye of 30% strength. 25.5 parts of piperidine are added thereto and 36 parts of gaseous chlorine are introduced into this mixture at a temperature of 55° C.

After cooling down the mixture to 20° C., the benzothiazyl-2-sulphene-piperidide separates in form of an oil which soon solidifies. The product is filtered off and dried. The yield is about 70%.

Example 10

50 parts of mercaptobenzothiazole are stirred with 300 parts of water and 40 parts of a sodium hydroxide lye of 30% strength, 17 parts of calcinated sodium carbonate and 51 parts of piperidine are added thereto. To this mixture, 85 parts of potassium persulphate are added in the course of 3 hours at a temperature of 35° C. After several hours' stirring the mixture is diluted with 250 parts of water and the precipitate is filtered off. The raw product thus obtained contains traces of dibenzothiazyldisulphide, which can easily be removed therefrom by treating the raw product with light benzine whereby only the benzothiazyl-2-sulphene-piperidide is dissolved.

Example 11

50 parts of mercaptobenzothiazole are stirred with 300 parts of water and 106 parts of dibutylamine are added thereto. The mixture is heated to 35° C. and a clear solution is obtained. An aqueous solution of 24.6 parts of sodium hypochlorite is caused to run in in the course of 6 hours at a temperature of 35° C. After 1 hour's stirring the mixture is cooled down to 15° C., diluted with 200 parts of water and carefully acidified by means of a 10% aqueous hydrochloric acid in order to dissolve the excess of dibutylamine. The oil which has been separated is taken up by means of light benzine and washed neutral. The solution is filtered in order to remove small traces of undissolved dibenzothiazyl-disulphide. After distilling off the light benzine, preferably under reduced pressure, there is obtained the benzothiazyl-2-sulphene dibutylamide in form of an oil. The yield is about 70%.

Example 12

50 parts of mercaptobenzothiazole are stirred with 300 parts of water and 114 parts of hexahydroethylaniline are added thereto. The mixture is heated to 50° C., whereby by a clear solution is obtained. After cooling down to 35° C. an aqueous solution of 24.6 parts of sodium hypochlorite is caused to run in in the course of 6 hours. After one hour's stirring the mixture is diluted with 300 parts of water. The aqueous layer is separated from the oily layer and the latter is taken up in benzene. This solution is stirred with a very diluted aqueous hydrochloric acid in order to remove the excess of hexahydroethylaniline, and then washed neutral. After distilling off the benzene under reduced pressure, there is obtained the benzothiazyl-2-sulphene-hexahydroethylanilide in form of a thick oil in a yield of about 75.5%.

Example 13

50 parts of mercaptobenzothiazole are stirred with 300 parts of water. 108.5 parts of methylbenzylamine are added thereto and at a temperature of about 35°, there are added 24.6 parts of sodium hypochlorite in form of an aqueous solution in the course of 5 hours. After some stirring the mixture is diluted with 300 parts of water and the oily layer is removed. The latter is dissolved in light benzine and stirred several times with diluted hydrochloric acid, and then washed neutral. After distilling off the light benzine under reduced pressure there are obtained 82 parts of benzothiazyl-2-sulphene-methylbenzylamide in a yield of about 85%.

Example 14

150 parts of ortho-ortho'-diamino-diphenyldisulphide of the formula

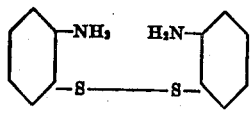

are heated with 306 parts of piperidine and 900 parts of pyridine to 50° C., whereby a clear solution is obtained. In the course of 6 hours there is caused to run in an aqueous solution of 49.5 parts of sodium hypochlorite, while keeping the temperature at about 50° C. After cooling down to 25° C., the pyridine and the excess of piperidine are removed by agitating the mixture several times with water. The residue solidifies to form a solid mass, which can be freed from unaltered disulphide by treating the same with light benzine, wherein the disulphide remains undissolved. The ortho-amino-phenylsulphene-piperidide of the formula:—

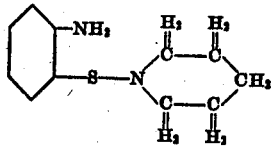

is obtained in form of well shaped crystals with a melting point of 66–68° C.

We claim:—

1. The process which comprises subjecting in aqueous medium a sulphur containing compound selected from the group consisting of organic mercaptans and disulphides of the aliphatic, alicyclic, aliphatic-aromatic and heterocyclic series to the action of an oxidizing agent useful in alkaline medium in the presence of a secondary amine.

2. The process which comprises causing in aqueous medium an oxidizing agent, selected from the group consisting of alkali hypochlorites, chlorine and bromine to react upon a mixture of a secondary amine and a sulphur containing organic compound selected from the group consisting of organic mercaptans and disulphides of the aliphatic, alicyclic, aliphatic-aromatic and heterocyclic series.

3. The process which comprises causing in aqueous medium an alkalihypochlorite to react upon a mixture of piperidine and mercaptobenzothiazole, the piperidine being employed in at least one molecular proportion calculated upon the amount of the mercaptobenzothiazole employed.

4. The process which comprises causing in aqueous medium an alkalihypochlorite to react upon a mixture of piperidine and dibenzothiazyldisulphide, the piperidine being employed in at least two molecular proportions calculated upon the amount of the dibenzothiazyldisulphide.

5. The process which comprises causing in aqueous medium an alkalihypochlorite to react upon a mixture of a diethylamine and mercaptobenzothiazole, the diethylamine being employed in at least one molecular proportion calculated upon the amount of the mercaptobenzothiazole employed.

EDUARD TSCHUNKUR.
HUGO KÖHLER.